(12) United States Patent
Nakamura

(10) Patent No.: US 8,323,140 B2
(45) Date of Patent: Dec. 4, 2012

(54) REDUCTION GEAR TRANSMISSION

(75) Inventor: Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 630 days.

(21) Appl. No.: 12/308,165

(22) PCT Filed: Jun. 11, 2007

(86) PCT No.: PCT/JP2007/061716
§ 371 (c)(1),
(2), (4) Date: Dec. 9, 2008

(87) PCT Pub. No.: WO2007/145162
PCT Pub. Date: Dec. 21, 2007

(65) Prior Publication Data
US 2009/0247349 A1  Oct. 1, 2009

(30) Foreign Application Priority Data
Jun. 13, 2006  (JP) .................. 2006-163263

(51) Int. Cl.
*F16H 1/32* (2006.01)
(52) U.S. Cl. ...................................... 475/179
(58) Field of Classification Search .................. 475/162, 475/163, 168, 178, 179
See application file for complete search history.

(56) References Cited

U.S. PATENT DOCUMENTS

| | | | |
|---|---|---|---|
| 3,129,611 A | 4/1964 | Lee | |
| 4,846,018 A * | 7/1989 | Matsumoto et al. | 475/149 |
| 5,286,235 A | 2/1994 | Gerat | |
| 5,312,305 A | 5/1994 | Palau | |
| 5,322,485 A * | 6/1994 | Haga | 475/178 |
| 5,655,985 A * | 8/1997 | Herstek | 475/179 |
| 6,517,460 B2 * | 2/2003 | Takeuchi et al. | 475/162 |
| 6,761,660 B2 * | 7/2004 | Lim | 475/179 |
| 7,604,559 B2 * | 10/2009 | Fujimoto et al. | 475/170 |
| 2001/0012809 A1 | 8/2001 | Fujimoto | |
| 2001/0044356 A1 | 11/2001 | Takeuchi et al. | |

(Continued)

FOREIGN PATENT DOCUMENTS
EP   1 296 084 A2   3/2003
(Continued)

OTHER PUBLICATIONS

Mar. 15, 2010 Office Action issued in the European Patent Application No. 07745006.2.

(Continued)

*Primary Examiner* — Roger Pang
(74) *Attorney, Agent, or Firm* — Oliff & Berridge, PLC

(57) ABSTRACT

The length of an inner meshing planetary gear type reduction gear transmission is reduced in its rotational axis line direction.
A crank member is arranged between a through hole of an external gear, a through hole of an external gear, and a support pin. An eccentric disk that fits with the through hole of the external gear and an eccentric disk that fits with the through hole of the external gear are formed on the crank member. A bearing is arranged between the support pin and the crank member, this bearing supporting the crank member such that the crank member is capable of rotating with respect to the support pin. The length of the reduction gear transmission in its rotational axis line direction is reduced by contracting the length of the crank member, this reduction in length not including the length thereof that has the eccentric disks.

9 Claims, 4 Drawing Sheets

U.S. PATENT DOCUMENTS

| | | | |
|---|---|---|---|
| 2003/0054912 A1* | 3/2003 | Nohara et al. | 475/162 |
| 2006/0205554 A1 | 9/2006 | Nohara et al. | |
| 2007/0243967 A1* | 10/2007 | Haga et al. | 475/162 |
| 2008/0207377 A1* | 8/2008 | Tsurumi et al. | 475/168 |
| 2009/0243297 A1 | 10/2009 | Nohara et al. | |

FOREIGN PATENT DOCUMENTS

| | | |
|---|---|---|
| EP | 1 662 138 A1 | 5/2006 |
| JP | A-5-248500 | 9/1993 |
| JP | A-5-248501 | 9/1993 |
| JP | 05346142 A * | 12/1993 ... 475/179 |
| JP | A-2000-154849 | 6/2000 |
| JP | A-2000-179630 | 6/2000 |
| JP | A-2001-221298 | 8/2001 |
| JP | A-2001-323972 | 11/2001 |
| JP | A-2002-295605 | 10/2002 |

OTHER PUBLICATIONS

Notification of Reasons for Rejection dated Jul. 3, 2012 from Japanese Patent Application No. 2008-521187 (with translation).

* cited by examiner

REDUCTION GEAR TRANSMISSION

TECHNICAL FIELD

The present application claims priority to Japanese Patent Application No. 2006-163263 filed on Jun. 13, 2006, the contents of which are hereby incorporated by reference into the present specification.

The present invention relates to a reduction gear transmission utilized in an industrial robot or a machinery tool, etc. In particular, the present invention relates to a technique for shortening the length in the direction of a rotational axis line of the reduction gear transmission.

BACKGROUND ART

In a case where an external gear having a number of teeth differing from the number of teeth of an internal gear is disposed inside the internal gear while the external gear is in a meshed state with the internal gear and the external gear is made to revolve orbitally around an axis line of the internal gear while maintaining the meshed state, the external gear rotates with respect to the internal gear. Inner meshing planetary gear type reduction gear transmissions utilizing this mechanism have been developed, and an example thereof is disclosed in Japanese Patent Application Publication No. 2000-154849. This reduction gear transmission comprises an internal gear, an external gear, a carrier, a crankshaft, and a bearing.

The external gear has a number of teeth differing from a number of teeth of the internal gear, and is surrounded by the internal gear. The external gear rotates while revolving orbitally with respect to the axis line of the internal gear while maintaining a meshed state with the internal gear. A plurality of through holes are formed in the external gear at positions offset from a center of the external gear.

A carrier is supported such that the carrier is capable of rotating with respect to the axis line of the internal gear. Further, a part of the carrier passes through some of the through holes formed in the external gear. A space is maintained between the through hole and the carrier. As a result, the carrier allows the external gear to revolve orbitally with respect to the axis line of the carrier, and the carrier rotates following the rotation of the external gear.

The crankshaft comprises a shaft part capable of rotating with respect to the carrier, an input gear fixed to the shaft part and capable of causing the shaft part to rotate, and an eccentric disk fixed to the shaft part and having its center at a position offset from an axis line of the shaft part. The eccentric disk of the crankshaft is fitted into the other through holes (the through holes into which the carrier is not inserted) of the external gear.

The bearing is arranged between the carrier and the shaft part of the crankshaft. Further, the bearing supports the shaft part of the crankshaft such that the shaft part is capable of rotating with respect to the carrier.

The eccentric disk of the crankshaft rotates eccentrically following the rotation of the input gear of the crankshaft. When the eccentric disk of the crankshaft rotates eccentrically, the external gear rotates while revolving orbitally with respect to the internal gear. When the external gear rotates, the carrier rotates with respect to the internal gear.

In the inner meshing planetary gear type reduction gear transmission, the crankshaft must be capable of rotating with respect to the carrier. In the conventional reduction gear transmission described above, the shaft part is formed so as to extend from the eccentric disk toward both sides in an axial direction of the crankshaft. This shaft part is supported with respect to the carrier by cylindrical roller bearings. That is, in the conventional reduction gear transmission, the shaft part is provided that extends from the eccentric disk toward both sides in the axial direction, and this shaft part must be supported by the bearings. As a result, the crankshaft becomes longer in its axial direction. The reduction gear transmission consequently becomes longer in its rotational axis line direction.

DISCLOSURE OF INVENTION

Problem to be Solved by the Invention

A reduction gear transmission may be embedded in, for example, a joint portion of an industrial robot. The joint portion of the industrial robot cannot be made more compact if the reduction gear transmission is long in its rotational axis line direction. Since the reduction gear transmission is embedded in the industrial robot or a machinery tool, it is desirable for the reduction gear transmission to be made shorter in its rotational axis line direction. In the present invention, a technique is realized whereby a reduction gear transmission is made shorter in its rotational axis line direction.

Means to Solve the Problem

The reduction gear transmission of the present invention comprises at least an internal gear, an external gear, a carrier, a crank member, and a bearing. The external gear has a number of teeth differing from a number of teeth of the internal gear, and is surrounded by the internal gear. The external gear is capable of rotating while revolving orbitally with respect to an axis line of the internal gear while maintaining the meshed state with the internal gear. Further, a through hole is formed in the external gear at a position offset from a center of the external gear. The carrier is supported such that the carrier is capable of rotating with respect to the axis line of the internal gear. Further, the carrier has a support pin passing through the through hole of the external gear. In the reduction gear transmission of the present invention, a crank member is utilized instead of the crankshaft that has been conventionally utilized. The crank member is arranged between the through hole of the external gear and the support pin of the carrier. The crank member comprises an input gear that rotates with respect to the support pin, and an eccentric disk whose center is offset from an axis line of the support pin. The eccentric disk of the crank member is fitted into the through hole of the external gear. The bearing is arranged between the crank member and the support pin of the carrier. The crank member is supported by the bearing such that the crank member is capable of rotating with respect to the support pin of the carrier.

In the reduction gear transmission of the present invention, the eccentric disk formed in the crank member rotates eccentrically when the input gear of the crank member rotates. The external gear revolves orbitally with respect to the axis line of the internal gear when the eccentric disk rotates eccentrically. Further, the external gear rotates with respect to the internal gear while revolving orbitally with respect to the axis line of the internal gear. When the external gear rotates with respect to the internal gear, the carrier rotates with respect to the internal gear.

In the reduction gear transmission described above, the bearing is arranged between the crank member and the support pin of the carrier, and the crank member is supported such that the crank member is capable of rotating with respect to the support pin. The crank member is supported by the bearing such that the crank member is capable of rotating with respect to the carrier. According to the reduction gear transmission described above, the length of the crank member can be shortened in the axial direction. That is, it is no longer necessary to provide bearings at both ends of the eccentric disk in the axial direction in order to support the crank member so as to be capable of rotating with respect to the carrier. Furthermore, it is no longer necessary to maintain a length on the crank member that is exclusively for providing the bearings. According to the reduction gear transmission described above, the crank member can be made shorter in the axial direction. As a result, the reduction gear transmission can be made more compact in its rotational axis line direction.

In the reduction gear transmission of the present invention, it is preferred that at least a part of the bearing is positioned within a range in which the eccentric disk is arranged along an axial direction of the crank member.

According to the reduction gear transmission described above, the bearing can be disposed inside the through hole of the external gear into which the eccentric disk is fitted, and it is thereby possible to reduce the length of the crank member in the axial direction, except for the length of the eccentric disk. It is more preferred that the bearing is positioned only within the range in which the eccentric disk is arranged along the axis line of the crank member, or positioned only within the range in which the eccentric disk and the input gear are formed. That is, the crank member can be simply composed with just the eccentric disk and the input gear. The length of the reduction gear transmission can be reduced in the rotational axis line direction by minimizing the length of the crank member in the axial direction.

In one embodiment of the reduction gear transmission of the present invention, a cylindrical roller bearing may be provided between the crank member and the support pin formed on the carrier. Furthermore, restriction members that restrict the movement of the crank member in the axial direction with respect to the support pin may be provided, whereas the respective restriction members are arranged at each end of the crank member in an axial direction of the crank member.

According to the reduction gear transmission described above, the crank member is not only supported so as to be capable of rotating with respect to the support pin, but the movement of the crank member in the axial direction is also restricted. The crank member can be prevented from rattling in the axial direction while the reduction gear transmission is operating. Further, for the purpose of the crank member is supported so as to be capable of rotating with respect to the support pin, it is possible to utilize the cylindrical roller bearing. Since the cylindrical roller bearing is an inexpensive type of bearing, the component cost of the reduction gear transmission can be reduced.

In another embodiment of the reduction gear transmission of the present invention, the bearing may be arranged between the crank member and the support pin and allows relative rotation of the crank member and the support pin. This bearing may restrict relative movement of the crank member and the support pin in an axial direction of the crank member and the support pin.

According to the reduction gear transmission described above, providing merely the one type of bearing not only supports the crank member so as to be capable of rotating with respect to the support pin, but also restricts the movement of the crank member in their coaxial direction. The crank member can be prevented from rattling in the axial direction during the operation of the reduction gear transmission without increasing the number of parts that are utilized.

In the reduction gear transmission of the present invention, the reduction gear transmission having been made shorter in its rotational axis line direction can be utilized in conjunction with other techniques. That is, in any of the reduction gear transmissions of the present invention described above, the carrier may extend over the internal gear to the outer side of the internal gear. A bearing may be arranged between the internal gear and an extending portion of the carrier that extends to the outer side of the internal gear. The bearing may allow relative rotation of the carrier and the internal gear. The bearing may also restrict relative movement of the carrier and the internal gear in an axial direction of the carrier and the internal gear.

According to the reduction gear transmission described above, the internal gear can be shortened in the axial direction. That is, the internal gear no longer needs to have a length for disposing the bearing between the carrier and the internal gear. The bearing can be arranged within the range, along the axis line, in which the internal gear and the external gear mesh. The bearing supports the carrier so as to allow the carrier to rotate with respect to the internal gear and restricts the relative movement of the carrier and the internal gear in the axial direction of the carrier and the internal gear. By shortening the internal gear in the axial direction, the reduction gear transmission can be made shorter in its rotational axis line direction.

A reduction gear transmission is already known in which a carrier extends to an outer side of an internal gear and a bearing is arranged between the internal gear and an extending portion of the carrier that extends to the outer side of the internal gear. However, although the bearing is arranged between the internal gear and the extending portion of the carrier that extends to the outer side of the internal gear in the prior art, this did not reduce the length of the reduction gear transmission in its rotational axis line direction. As described above, in the conventional reduction gear transmission, shaft parts are formed at both ends of the eccentric disk of the crankshaft. The bearings are provided between the shaft parts and the carrier in order for the crankshaft to be supported so as to be capable of rotating with respect to the carrier. In the conventional reduction gear transmission, the length of the reduction gear transmission cannot be reduced in its rotational axis line direction even if the method described above is adopted. This is because the length of the crankshaft in the axial direction does not change. In the conventional reduction gear transmission, it is not meaningful to dispose the bearing between the internal gear and the portion of the carrier that extends to the outer side of the internal gear in order to decrease the length of the reduction gear transmission in its rotational axis line direction. Extending the carrier to the outer side of the internal gear only increases the radius of the reduction transmission. Arranging the bearing between the internal gear and the extending portion of the carrier that extends to the outer side of the internal gear contributes to decreasing the length of the reduction gear transmission in its rotational axis line direction only when the length of the crankshaft (equivalent to the crank member of the present invention) in the axial direction is reduced first.

It is preferred that the reduction gear transmission of the present invention comprises a spur gear that meshes with the input gear and rotates with respect to the axis line of the internal gear. When this spur gear rotates, the input gear revolves orbitally with respect to the axis line of the internal gear while rotating. When the input gear revolves orbitally with respect to the axis line of the internal gear, the support pin that is inserted into the input gear revolves orbitally with respect to the axis line of the internal gear, and the carrier rotates with respect to the axis line of the internal gear following the support pin.

According to the reduction gear transmission described above, the axis line of the internal gear and an axis line of a motor or the like can be disposed coaxially. The layout of the reduction gear transmission and the motor or the like can thus be made more compact. Further, in the case where a plurality of crank members are utilized, the torque of the motor or the like can be transmitted equally to all of the crank members. That is, it is possible to prevent the torque of the motor or the like being applied to only one crank member. Since the load applied to the crank members is distributed, the durability of the crank members increases (the life of the crank members becomes longer).

EFFECTS OF THE INVENTION

According to the reduction gear transmission of the present invention, the length of the reduction gear transmission can be shortened in its rotational axis line direction by reducing the length of the crank member in the axial direction.

According to the reduction gear transmission of claim 2, the bearing can be positioned within a range in which the eccentric disk and the external gear engage along the axial direction of the crank member. The crank member is supported by the bearing so as to be capable of rotating with respect to the support pin. As a result, the length of the crank member in the axial direction can be further shortened.

According to the reduction gear transmission of claims 3 and 4, the crank member can be supported so as to be capable of rotating with respect to the support pin, and the movement of the crank member in the axial direction can be restricted.

EMBODIMENTS OF THE INVENTION

Figure 1:
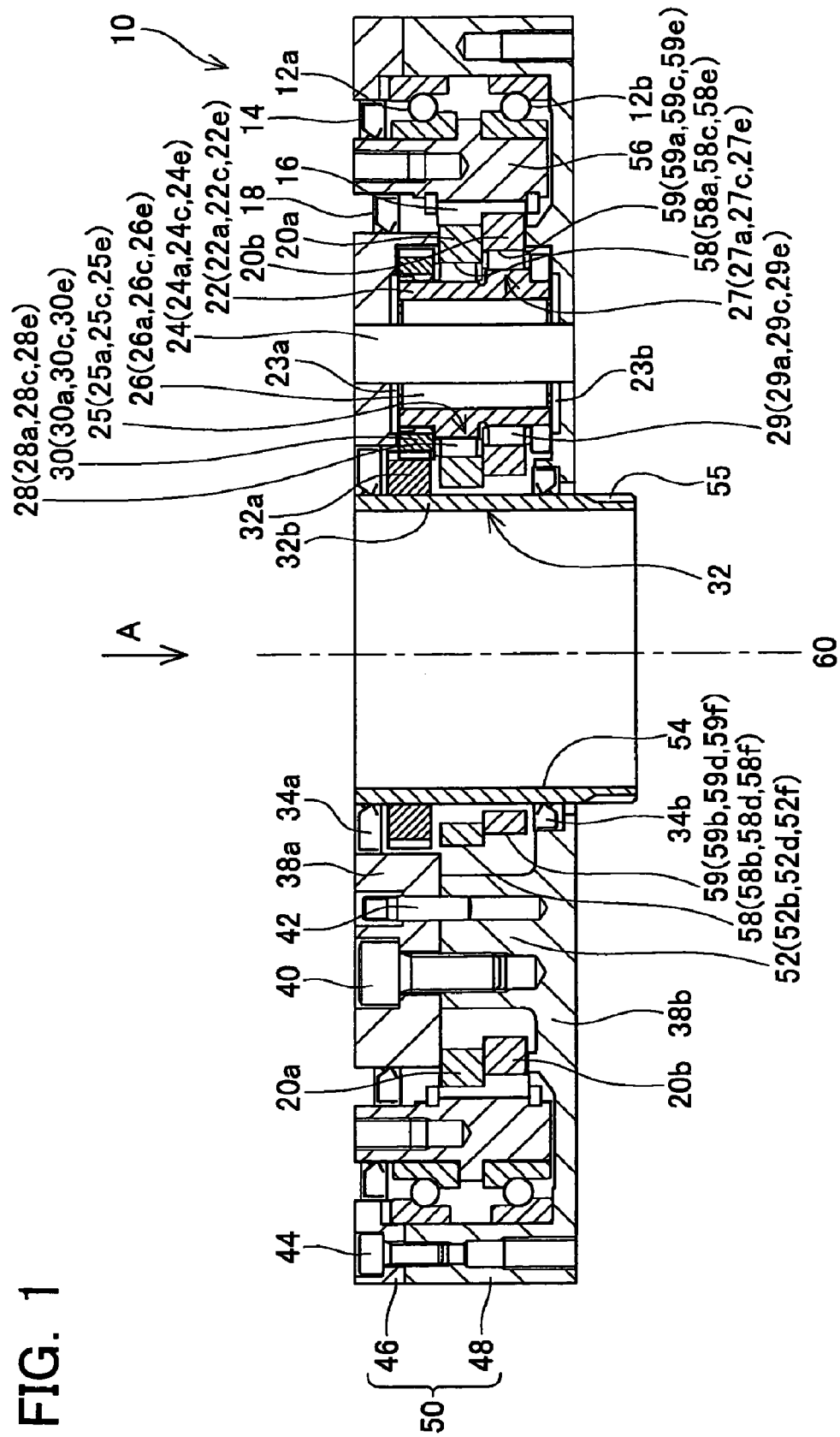
FIG. 1 shows a cross-sectional view of main parts of a reduction gear transmission of a first embodiment.

Some of the features of the present embodiments will be described below.

(Feature 1) A needle bearing 26 is arranged between a support pin 24 and a crank member 22. The crank member 22 is supported by the needle bearing 26 so as to be capable of rotating with respect to the support pin 24. A pair of thrust washers 23*a* and 23*b* is arranged at both ends in an axial direction of the crank member 22. The movement of the crank member 22 in the axial direction with respect to the support pin 24 is restricted by the thrust washers 23*a* and 23*b*.

(Feature 2) A carrier 38*b* extends over an internal gear 56 to an outer side of the internal gear 56, forming a first support part 48 of a support part 50. A pair of angular ball bearings 12*a* and 12*b* is arranged between the support part 50 and the internal gear 56. The pair of angular ball bearings 12*a* and 12*b* allows the internal gear 56 to rotate with respect to the support part 50 and restrict the movement of the internal gear 56 in an axial direction.

(Feature 3) A spur gear 32 that meshes with a gear 30 (an input gear) of the crank member 22 is arranged at a central portion of the reduction gear transmission 10.

(Feature 4) Through holes are formed in central portions of external gears 20*a* and 20*b*, carriers 38*a* and 38*b*, and the spur gear 32.

(Feature 5) A pair of tapered roller bearings 126*a* and 126*b* is arranged between a support pin 124 and the crank member 22. The pair of tapered roller bearings 126*a* and 12*b* allow the crank member 22 to rotate with respect to the support pin 124 and restrict the movement of the crank member 22 in an axial direction.

(Feature 6) The support part 50 of the reduction gear transmission 10 is connected with a front step arm 82 of a robot arm 200, and the internal gear 56 of the reduction gear transmission 10 is connected with a back step arm 78. The back step arm 78 is capable of rotating with respect to the front step arm 82 around an axis line CL.

Figure 2:
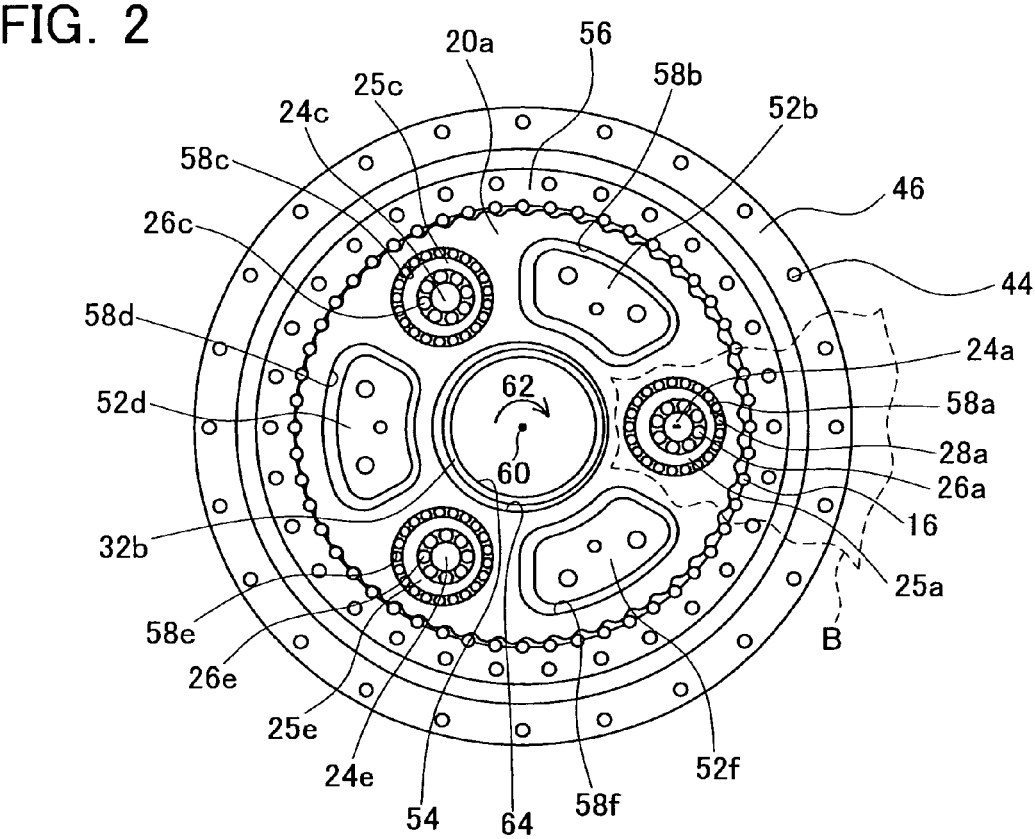
FIG. 2 shows a plan view of the reduction gear transmission of the first embodiment.
Figure 3:
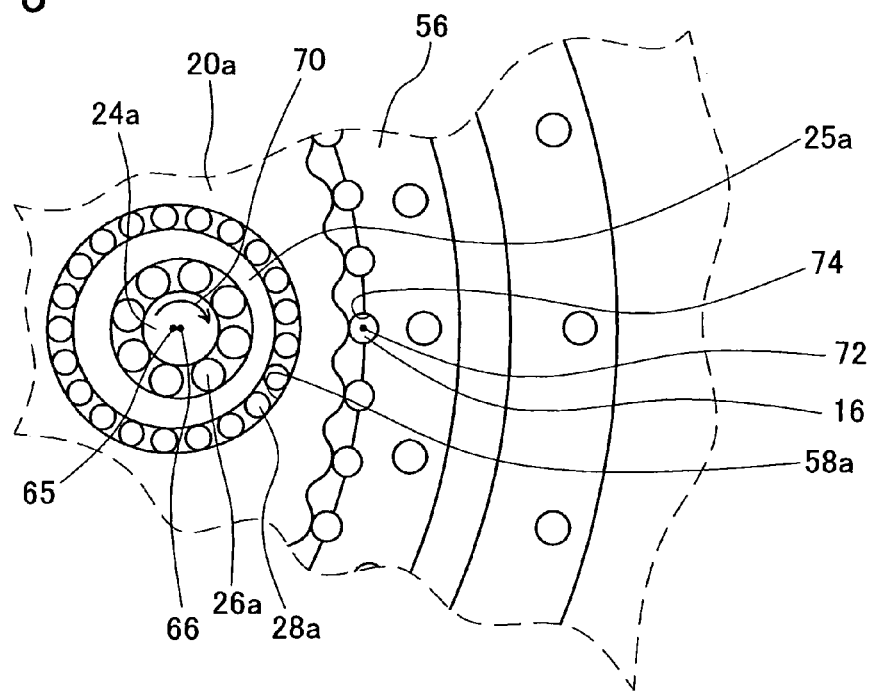
FIG. 3 shows an enlarged view of region B surrounded by the dotted line in FIG. 2.

Embodiments of the present invention will be described with reference to figures.
(First Embodiment)
FIG. 1 shows a cross-sectional view of main parts of a reduction gear transmission 10 of the present embodiment. FIG. 2 shows a plan view viewed from the arrow A in the figure with a carrier 38*a*, an oil seal 34*a*, an oil seal 18, and a gear part 32*a* (to be described) removed. FIG. 3 shows an expanded view of a region B surrounded by the broken line in FIG. 2.

The reduction gear transmission 10 comprises an internal gear 56, a pair of external gears 20*a* and 20*b*, carriers 38*a* and 38*b*, three crank members 22*a*, 22*c*, and 22*e*, and three cylindrical roller bearings (here, needle bearings) 26*a*, 26*c*, and 26*e*. Below, in the case where a phenomenon is described in common for parts that are present in plural numbers and are of an identical type, the letters appended to the numbers may be omitted.

As shown in FIG. 2, the external gear 20*a* has a number of teeth differing from the number of teeth of the internal gear 56, and is surrounded by the internal gear 56. The external gear 20*a* is capable of maintaining a meshed state with the internal gear 56 and rotating while revolving orbitally with respect to an axis line 60 of the internal gear 56. The external gear 20*a* is meshed with the internal gear 56 via internal pins 16. The internal pin 16 has a cylindrical column shape. Six through holes 58*a* to 58*f* (see FIG. 2) are formed in the external gear 20*a* at positions offset from the center of the external gear 20*a*. Further, a through hole 64 (see FIG. 2) is formed in a central portion of the external gear 20*a*.

The description of the external gear 20*a* is also applicable unchanged to the external gear 20*b*. The six through holes of the external gear 20*b* are represented by 59*a* to 59*f*. The external gear 20*a* and the external gear 20*b* are offset symmetrically with respect to the axis line 60 of the internal gear 56 (see FIG. 1).

As shown in FIG. 1, the external gears 20*a* and 20*b* mesh with the internal gear 56 via the common internal pins 16.

As shown in FIG. 1, the carriers 38*a* and 38*b* are supported so as to be capable of rotating around the axis line 60 of the internal gear 56 (see FIG. 2) by a pair of angular ball bearings 12*a* and 12*b*. As shown in FIG. 1 and FIG. 2, three column parts 52*b*, 52*d*, and 52*f* are formed on the carrier 38*b*. The column part 52*b* passes through the through hole 58*b* of the external gear 20*a* and the through hole 59*b* of the external gear 20*b*. A space is maintained between the column part 52*b* and the through hole 58b that allows the external gear 20a to revolve orbitally around the axis line 60 of the internal gear 56. A space is maintained between the column part 52b and the through hole 59b that allows the external gear 20b to revolve orbitally around the axis line 60 of the internal gear 56. The column part 52d passes through the through hole 58d of the external gear 20a and the through hole 59d of the external gear 20b. A space is maintained between the column part 52d and the through hole 58d that allows the external gear 20a to revolve orbitally around the axis line 60 of the internal gear 56. A space is maintained between the column part 52d and the through hole 59d that allows the external gear 20b to revolve orbitally around the axis line 60 of the internal gear 56. The column part 52f passes through the through hole 58f of the external gear 20a and the through hole 59f of the external gear 20b. A space is maintained between the column part 52f and the through hole 58f that allows the external gear 20a to revolve orbitally around the axis line 60 of the internal gear 56. A space is maintained between the column part 52f and the through hole 59f that allows the external gear 20b to revolve orbitally around the axis line 60 of the internal gear 56.

As will be described later, since the carrier 38b rotates around the axis line 60 of the internal gear 56, the external gears 20a and 20b rotate around the axis line 60 of the internal gear 56.

The carrier 38a is fixed to the carrier 38b by a bolt 40. The carrier 38a is first fixed in a predetermined position with respect to the carrier 38b by a position fixing pin 42, and is then fixed by the bolt 40. The carriers 38a and 38b are formed above and below the external gears 20a and 20b in the axial direction thereof so as to have the external gears 20a and 20b therebetween. The movement of the external gears 20a and 20b in the axial direction (thrust direction) is restricted by the carriers 38a and 38b. Further, the carriers 38a and 38b prevent the reduction gear transmission 10 from being distorted in a direction orthogonal to its rotational axis line while the reduction gear transmission 10 is operating. That is, the torsional rigidity of the reduction gear transmission 10 can be increased by the carriers 38a and 38b. The column parts 52 pass through the through holes 58 and 59 formed in the external gears 20a and 20b.

Further, three support pins 24a, 24c, and 24e are fixed to the carriers 38a and 38b. The support pin 24a passes through the through hole 58a of the external gear 20a and the through hole 59a of the external gear 20b. The support pin 24c passes through the through hole 58c of the external gear 20a and the through hole 59c of the external gear 20b. The support pin 24e passes through the through hole 58e of the external gear 20a and the through hole 59e of the external gear 20b.

The carrier 38b extends to an outer side of the internal gear 56, and forms a first support part 48. A second support part 46 is fixed to the first support part 48 by a bolt 44. A support part 50 is formed from the first support part 48 and the second support part 46. The pair of angular ball bearings 12a and 12b is arranged in front-facing assembly between the support part 50 and the internal gear 56. "Front-facing assembly" refers to a state in which an outer race of the angular ball bearings 12a and 12b applies pressure to the ball from the outer side in the direction of the axis line 60 of the internal gear 56. The support part 50 and the internal gear 56 are allowed to rotate with respect to one another, and their movement with respect to one another in their coaxial direction is restricted by the pair of angular ball bearings 12a and 12b.

The pair of angular ball bearings 12a and 12b is arranged along almost the entire length of the internal gear 56 in its axial direction. That is, the pair of angular ball bearings 12a and 12b is arranged within the range of the length in the axial direction in which the internal gear 56 and the external gears 20a and 20b mesh. The length in the axial direction of the internal gear 56 that does not include the portion thereof that meshes with the external gears 20a and 20b can be reduced by arranging the pair of angular ball bearings 12a and 12b within the aforesaid range of the length in the axial direction in which the internal gear 56 and the external gears 20a and 20b mesh. That is, for the bearings are arranged between the internal gear 56 and the carriers 38a and 38b, it is not necessary to increase length in the direction of the axis line 60 of the internal gear 56. Further, since the angular ball bearings 12a and 12b are arranged by front-facing assembly, the length of the internal gear 56 in the axial direction can be reduced compared to the case in which the angular ball bearings are arranged by rear face assembly. Moreover, "rear face assembly" refers to a state in which an inner ring of the angular ball bearings 12a and 12b applies pressure to the ball from an outer side in the direction of the axis line 60 of the internal gear 56.

As shown in FIG. 1, a gear 30 (an input gear), an eccentric disk 25, and an eccentric disk 27 are formed on the crank members 22. The crank member 22a is arranged between the through hole 58a of the external gear 20a, the through hole 59b of the external gear 20b, and the support pin 24a. The crank member 22c is arranged between the through hole 58c of the external gear 20a, the through hole 59c of the external gear 20b, and the support pin 24c. The crank member 22e is arranged between the through hole 58e of the external gear 20a, the through hole 59e of the external gear 20b, and the support pin 24e.

The needle bearing 26a is arranged between the support pin 24a and the crank member 22a. The crank member 22a is supported by the needle bearing 26a so as to be capable of rotating with respect to the support pin 24a. The needle bearing 26c is arranged between the support pin 24c and the crank member 22c. The crank member 22c is supported by the needle bearing 26c so as to be capable of rotating with respect to the support pin 24c. The needle bearing 26e is arranged between the support pin 24e and the crank member 22e. The crank member 22e is supported by the needle bearing 26e so as to be capable of rotating with respect to the support pin 24e.

A pair of thrust washers 23a and 23b is arranged at both ends in an axial direction of each of the crank members 22, and the thrust washers 23a and 23b prevent rattling of the crank members 22 in the axial direction while the reduction gear transmission 10 is operating.

The needle bearing 26 is arranged along almost the entire length of the crank member 22 in the axial direction thereof. Arranging the needle bearing 26 within the range of the length in the axial direction in which the eccentric disks 25 and 27 are formed allows the length of the crank member 22 to be reduced, this reduction in length thus not including where the eccentric disks 25 and 27 are formed. That is, for the bearings are arranged between the crank member 22 and the carriers 38a and 38b, it is not necessary to increase the length in the axial direction of the crank member 22.

The gear 30 of each of the crank members 22 is provided on an axis line that is identical with an axis line 66 (see FIG. 3) of the support pin 24, and rotates with respect to the axis line 66. When the gear 30 rotates, the crank member 22 rotates with respect to the axis line 66.

The eccentric disks 25 and 27 have a center 65 (see FIG. 3) that is offset from the axis line 66 (see FIG. 3) of the support pin 24. The directions in which the eccentric disks 25 and 27 are offset are opposite directions. That is, the center 65 of the eccentric disk 25 and the center of the eccentric disk 27 are on opposite sides with the axis line 66 (see FIG. 3) of the support pin 24 between the two.

The eccentric disk 25a is fitted into the through hole 58a of the external gear 20a, and the eccentric disk 27a is fitted into the through hole 59a of the external gear 20b. The eccentric disk 25c is fitted into the through hole 58c of the external gear 20a, and the eccentric disk 27c is fitted into the through hole 59c of the external gear 20b. The eccentric disk 25e is fitted into the through hole 58e of the external gear 20a, and the eccentric disk 27e is fitted into the through hole 59e of the external gear 20b.

A needle bearing 28a is arranged between the eccentric disk 25a and the through hole 58a of the external gear 20a. The needle bearing 28a allows the eccentric disk 25a to rotate at an inner side of the through hole 58a of the external gear 20a. A needle bearing 29a is arranged between the eccentric disk 27a and the through hole 59a of the external gear 20b. The needle bearing 29a allows the eccentric disk 27a to rotate at an inner side of the through hole 59a of the external gear 20b.

A needle bearing 28c is arranged between the eccentric disk 25c and the through hole 58c of the external gear 20a. The needle bearing 28c allows the eccentric disk 25c to rotate at an inner side of the through hole 58c of the external gear 20a. A needle bearing 29c is arranged between the eccentric disk 27c and the through hole 59c of the external gear 20b. The needle bearing 29c allows the eccentric disk 27c to rotate at an inner side of the through hole 59c of the external gear 20b.

A needle bearing 28e is arranged between the eccentric disk 25e and the through hole 58e of the external gear 20a. The needle bearing 28e allows the eccentric disk 25e to rotate at an inner side of the through hole 58e of the external gear 20a. A needle bearing 29e is arranged between the eccentric disk 27e and the through hole 59e of the external gear 20b. The needle bearing 29e allows the eccentric disk 27e to rotate at an inner side of the through hole 59e of the external gear 20b.

When the gear 30 of the crank members 22 rotates, the eccentric disks 25 and 27 rotate eccentrically. That is, as shown in FIG. 3, the center 65 of the eccentric disks 25a, 25c, and 25e revolve orbitally with respect to the axis line 66 of the support pins 24a, 24c, and 24e, as shown by the arrow 70. Moreover, the arrow 70 shows only the direction of orbital revolution, and does not accurately show the radius of orbital revolution. The actual radius of orbital revolution is identical with the distance between the center 65 and the axis line 66 (the offset distance). When the eccentric disks 25a, 25c, and 25e revolve orbitally with respect to the axis line 66, the external gear 20a revolves orbitally with respect to the internal gear 56 around the axis line 60, as shown by the arrow 62 (see FIG. 2). Moreover, the arrow 62 shows only the direction of orbital revolution, and does not accurately show the radius of orbital revolution. The actual radius of orbital revolution is identical with the offset distance between the center 65 and the axis line 66.

Since the external gear 20a is meshed with the internal gear 56 when the external gear 20a revolves orbitally around the axis line 60, the external gear 20a rotates with respect to the internal gear 56. When the external gear 20a rotates, the carriers 38a and 38b rotate with respect to the internal gear 56.

Similarly, when the gear 30 of the crank members 22 rotates, the center 65 of the eccentric disks 27a, 27c, and 27e revolves orbitally with respect to the axis line 66 of the support pins 24a, 24c, and 24e, as shown by the arrow 70. When the eccentric disks 27a, 27c, and 27e revolve orbitally with respect to the axis line 66, the external gear 20b revolves orbitally with respect to the internal gear 56 around the axis line 60 of the internal gear 56, as shown by the arrow 62 (see FIG. 2). Since the external gear 20b is meshed with the internal gear 56 when the external gear 20b revolves orbitally with respect to the axis line 60, the external gear 20b rotates with respect to the internal gear 56. When the external gear 20b rotates, the carriers 38a and 38b rotate with respect to the internal gear 56.

As shown in FIG. 1, a spur gear 32 is formed at a center portion of the reduction gear transmission 10. The spur gear 32 comprises a shaft part 32b, a gear part 32a fixed to an upper part of the shaft part 32b, and a protrusion 55 formed below the shaft part 32b. As shown in FIG. 2, the spur gear 32 passes through the through hole 64 of the external gears 20a and 20b. The gear part 32a of the spur gear 32 meshes with the gears 30a, 30c, and 30e formed on the crank members 22a, 22c, and 22e. The protrusion 55 is capable of meshing with a spline formed on an output shaft (rotating shaft) of a motor or the like (not shown). In the present embodiment, the protrusion 55 is formed below the shaft part 32b. However, a spur gear or the like may be formed instead of the protrusion 55. What is important here is that a means is formed that transmits the torque of the motor or the like (not shown) to the spur gear 32. A through hole 54 is formed in a center portion of the spur gear 32, and wiring or tubing, etc. is capable of passing through the through hole 54.

A pair of oil seals 34a and 34b is formed between the shaft part 32b of the spur gear 32 and the carriers 38a and 38b. Oil that has been inserted between the spur gear 32 and the crank member 22 can be prevented from leaking to the exterior of the reduction gear transmission 10 by the oil seals 34a and 34b. The oil seal 18 is formed between the carrier 38a and the internal gear 56. Oil that has been inserted between the external gears 20a and 20b and the internal gear 56 can be prevented from leaking out of the reduction gear transmission 10 by the oil seal 18. An oil seal 14 is formed between the internal gear 56 and the second support part 46 of the support part 50. Oil that has been inserted between the internal gear 56 and the support part 50 can be prevented from leaking out of the reduction gear transmission 10 by the oil seal 14.

As shown in FIG. 2, the number of teeth of the external gear 20a is less than the number of teeth of the internal gear 56. When the external teeth in the circumference direction of the external gear 20a are in an engaged state with the internal pins 16 in the circumference direction of the internal gear 56, the external gear 20a is capable of revolving orbitally with respect to the axis line 60 of the internal gear, as shown by the arrow 62. The internal pins 16 are not fixed to the internal gear 56. The internal pins 16 are arranged within a groove 74 (see FIG. 3) formed in the internal gear 56, and are capable of rotating around an axis line 72 (see FIG. 3). The relationship between the internal pins 16 and the internal gear 56 is the same for each of the fifty-two internal pins 16.

When the rotation of the internal gear 56 is restricted, the external gear 20a rotates in a direction opposite to the arrow 62 while revolving orbitally in the direction of the arrow 62 within the internal gear 56. When the external gear 20a rotates, the support pins 24a, 24c, and 24e and the column parts 52b, 52d, and 52f revolve orbitally following the rotation of the external gear 20a. That is, the carriers 38a and 38b (see FIG. 1) rotate in the direction opposite to the arrow 62, and act an output part of the reduction gear transmission 10. On the other hand, when the rotation of the external gear 20a is restricted, the external gear 20a revolves orbitally in the direction of the arrow 62 within the internal gear 56. When the external gear 20a revolves orbitally, the internal gear 56 rotates in the direction of the arrow 62. The internal gear 56 acts the output part of the reduction gear transmission 10. When the rotation of the external gear 20a is restricted, the carriers 38a and 38b do not rotate nor revolve orbitally.

In the present embodiment, the number of teeth of the internal gear 56 is fifty-two teeth, and the number of teeth of the external gear 20a is fifty-one teeth. As a result, when the rotation of the internal gear 56 is restricted, the external gear 20a makes one rotation for every fifty-two orbital revolutions of the external gear 20a. On the other hand, when the rotation of the external gear 20a is restricted, the internal gear 56 makes one rotation for every fifty-two orbital revolutions of the external gear 20a.

The description of the external gear 20a is also applicable unchanged to the external gear 20b. Only the direction of being offset from the axis line 66 of the support pin 24a is the opposite direction. In the state shown in FIG. 2 and FIG. 3, the center 65 of the eccentric disk 25a and the center of the eccentric disk 27a are on opposing sides with the axis line 66 of the support pin 24a positioned between the two. That is, the external gear 20a and the external gear 20b are positioned symmetrically with respect to the support pin 24a, and a relationship is realized in which rotational balance is ensured. Moreover, the relationship of the eccentric disks 27c and 27e with the support pins 24c and the 24e respectively have a relationship identical with that between the eccentric disk 27a and the support pin 24a.

In the reduction gear transmission 10 of the present embodiment, when the output shaft of the motor or the like (not shown) rotates, the gear part 32a of the spur gear 32 is rotated around the axis line 60 of the internal gear 56 via the protrusion 55 formed on the spur gear 32. That is, the rotation speed of the gear part 32a is the same as the rotation speed of the output shaft of the motor or the like. The rotation transmitted to the gear part 32a is transmitted to the gear 30 formed on the crank member 22. The rotation speed of the output shaft of the motor or the like can be changed by adjusting the number of teeth of the gear part 32a and the number of teeth of the gear 30. That is, the rotation speed of the output shaft of the motor or the like can be both decreased and increased. The rotation speed of the output shaft of the motor or the like can also remain unchanged by having the number of teeth of the gear part 32a and the number of teeth of the gear 30 be identical.

When the crank member 22 rotates, the eccentric disks 25 and 27 of the crank member 22 revolve orbitally around the axis line 66 of the support pin 24 (see FIG. 3). When the eccentric disks 25 and 27 revolve orbitally, the external gears 20a and 20b revolve orbitally in the direction of the arrow 62 (see FIG. 2) while in a meshed state with the internal gear 56 via the internal pins 16. When the rotation of the internal gear 56 is restricted, the external gears 20a and 20b rotate while revolving orbitally under a meshed state with the internal gear 56. When the external gears 20a and 20b rotate, the carriers 30a and 30b rotate with respect to the axis line 60. When the rotation of the external gears 20a and 20b is restricted, the external gears 20a and 20b revolve orbitally in the direction of the arrow 62 while in a meshed state with the internal gear 56. When the external gears 20a and 20b revolve orbitally, the internal gear 56 rotates with respect to the axis line 60 in the direction of the arrow 62.

The ratio between the rotation speed of the crank shaft 22 and the rotation speed of the output part of the reduction gear transmission 10 can be changed by adjusting the number of teeth of the internal gear 56 and the external gears 20a and 20b.

Figure 4:
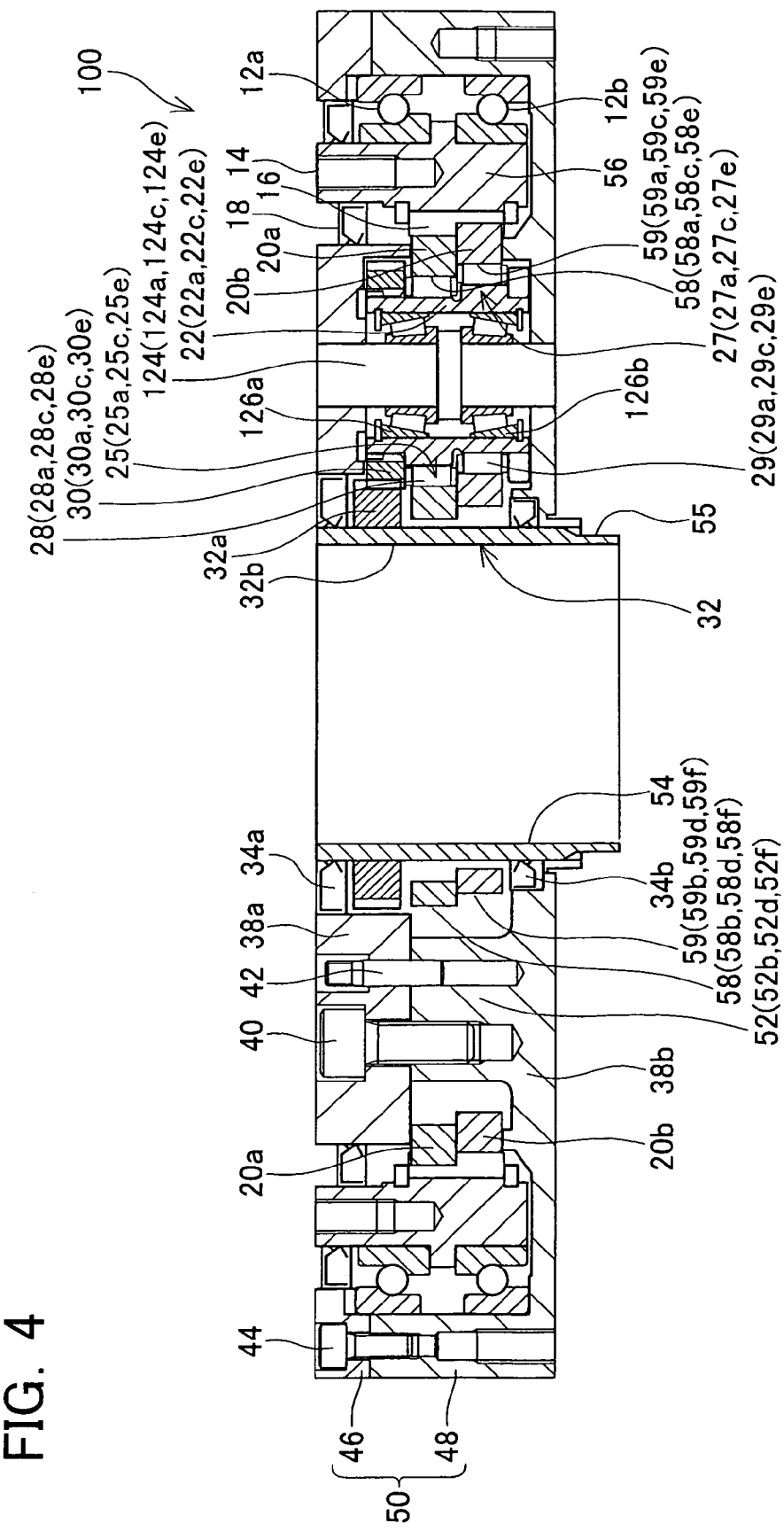
FIG. 4 shows a cross-sectional view of main parts of a reduction gear transmission of a second embodiment.

(Second Embodiment)
FIG. 4 shows a cross-sectional view of main parts of another reduction gear transmission 100 of the present invention. Here, only parts differing from the first embodiment will be described. Components that are the same as in the first embodiment will have the same reference numbers applied thereto and an explanation thereof will be omitted.

The thrust washers 23a and 23b that are utilized in the reduction gear transmission 10 are not utilized in the reduction gear transmission 100. The crank member 22 is arranged between the through hole 58 of the external gear 20a, the through hole 59 of the external gear 20b, and a support pin 124. A pair of bearings (here, tapered roller bearings) 126a and 126b is arranged between the support pin 124 and the crank member 22. The crank member 22 is supported by the pair of bearings 126a and 126b such that the crank member 22 is capable of rotating with respect to the support pin 124 and the movement of the crank member 22 in an axial direction is restricted. Further, the pair of tapered roller bearings 126a and 126b can apply pressure in a direction orthogonal to the axial direction between the support pin 124 and the crank member 22. Rattling of the crank member 22 with respect to an axis line of the support pin 124 can thereby be suppressed while the reduction gear transmission 100 is operating. Further, the pair of tapered roller bearings 126a and 126b is arranged along approximately the entire length in the axial direction of the crank member 22. That is, the tapered roller bearings 126a and 126b are arranged within a range of the length in the axial direction in which the eccentric disks 25 and 27 are formed. The length of the crank member 22 can be reduced, this reduction in length excluding where the eccentric disks 25 and 27 are formed.

Figure 5:
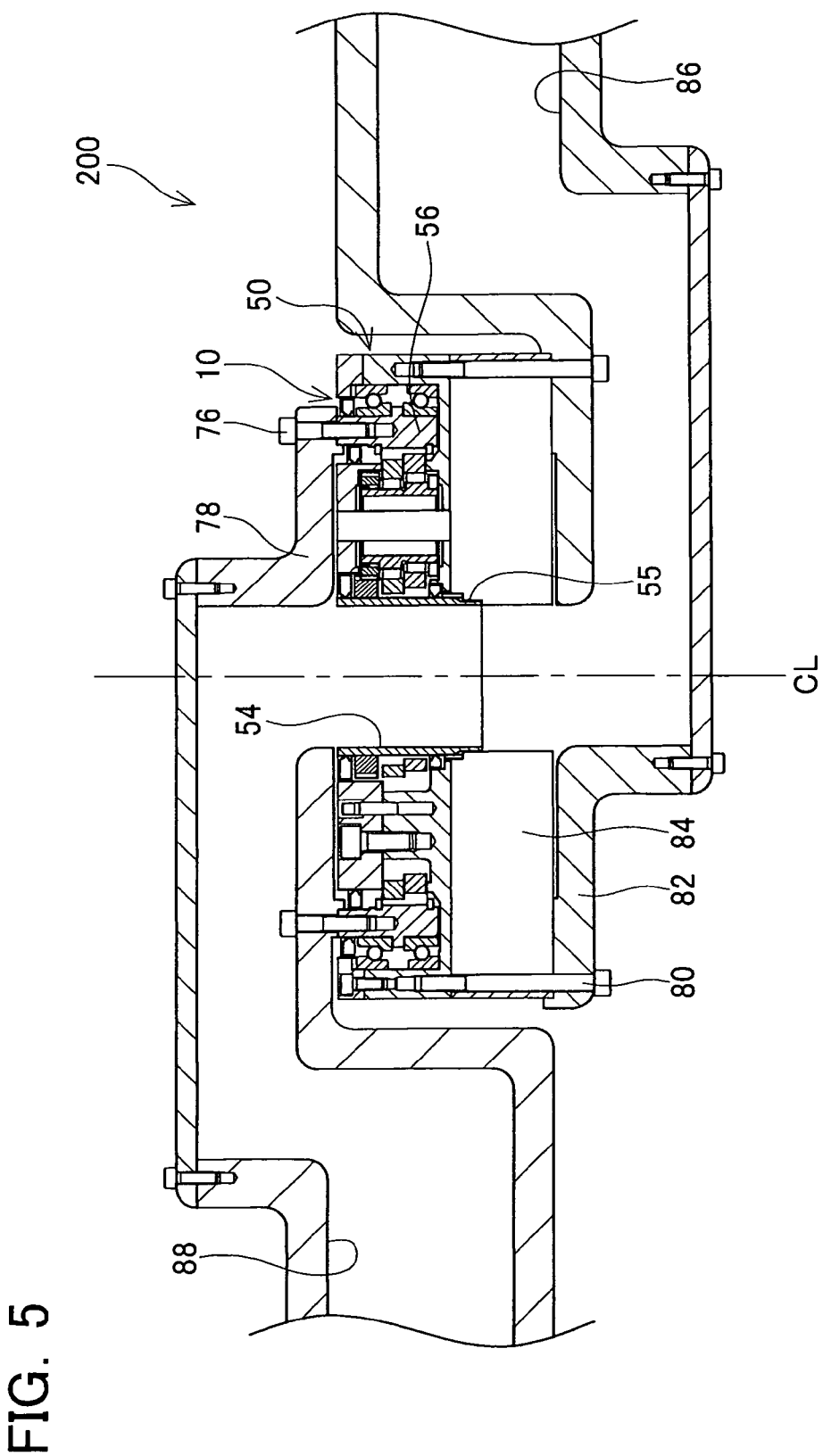
FIG. 5 shows a cross-sectional view of main parts of a joint part of an industrial robot utilizing the reduction gear transmission of the first embodiment.

(Third Embodiment)
FIG. 5 shows a cross-sectional view of main parts of a joint part 200 of an industrial robot utilizing the reduction gear transmission 10 of the present invention. The joint part 200 comprises a front step arm 82, a back step arm 78, and the reduction gear transmission 10. The front step arm 82 is fixed to the support part 50 of the reduction gear transmission 10 by a bolt 80. The back step arm 78 is fixed to the internal gear 56 of the reduction gear transmission 10 by a bolt 76. A hole 86 is formed in the front step arm 82 and a hole 88 is formed in the back step arm 78. The hole 86, the hole 88, and the hole 54 of the spur gear 32 communicate. A member for transmitting rotation to another reduction gear transmission or wiring can pass through the interior of the holes 86, 88, and 54. The back step arm 78 is capable of rotating with respect to the front step arm 82 with respect to an axis line CL.

A motor or the like that is capable of outputting rotation is arranged within a space 84. The rotation of an output part of the motor or the like is transmitted to the protrusion 55 of the reduction gear transmission 10. The internal gear 56 is caused to rotate with respect to the support part 50 by the rotation of the protrusion 55. The back step arm 78 can be caused by the rotation of the internal gear 56 to rotate with respect to the front step arm 82 with respect to the axis line CL.

Specific examples of the present invention have been described in detail above. However, these examples are merely illustrations, and do not limit the scope of the claims. The technology described in the patent claims also encompasses various changes and modifications to the specific examples described above.

For example, in the embodiments described above, the carriers form support parts that extend to the outer side of the internal gear. The internal gear is capable of rotating with respect to the support parts, and its movement in the axial direction is restricted. However, it need not necessarily be carriers that form the support parts that extend to the outer side of the internal gear. The internal gear may be capable of rotating with respect to a carrier at an inner side of the internal gear, and its movement in the axial direction may be restricted. In this case, the bearing may be arranged between the internal gear and the carrier, avoiding the portion where the internal gear and the external gear mesh.

In the embodiments described above, the through holes are formed in the center of the external gear, the center of the carrier, and the center of the spur gear. However, through holes are not necessarily required in the case where wiring, etc. is not passed through the interior of the reduction gear transmission. That is, the through holes may be formed in accordance with the aim and intended use of the reduction gear transmission.

In the embodiments, a part of the carrier passes through the through hole formed in the external gear. The part of the carrier may equally well not pass through the through hole formed in the external gear. In the present invention, the support pin fixed to the carrier passes through the through hole formed in the external gear. That is, when the external gear rotates, the support pin rotates following the rotation of the external gear. As a result, the carrier rotates following the rotation of the external gear.

In the embodiments described above, three crank members have been formed, and the torque of the motor or the like is transmitted simultaneously to the three crank members via the spur gear. However, the number of crank members is not restricted to three. Furthermore, the torque of the motor or the like can be transmitted directly to one crank member out of the plurality of crank members. The method of transmitting the torque of the motor or the like to the crank member may be selected in accordance with the type of motor or the like utilized.

In the embodiments described above, two external gears are utilized, and these are offset symmetrically with respect to the axis line of the internal gear. However, the number of external gears is not restricted to two. The number of external gears may be one, or may be three or more. Decreasing the number of external gears contributes to decreasing the length of the reduction gear transmission along its rotational axis line direction. Increasing the number of number of external gears improves the rotational balance of the reduction gear transmission. The number of number of external gears can be selected in accordance with the aim and intended use of the reduction gear transmission.

The technological components described in the present specification or drawings exhibit technological utility either individually or in various combinations, and are not limited to the combinations disclosed in the claims at the time of application. Furthermore, the technology illustrated in the present specification or the drawings may simultaneously achieve a plurality of objects, and has technological utility by achieving one of those objects.

The invention claimed is:

1. A reduction gear transmission comprising:
an internal gear;
an external gear that has a through hole at a position offset from a center of the external gear, revolving orbitally with respect to the internal gear while meshing with the internal gear;
a carrier that is rotably supported by the internal gear, and has a support pin passing through the through hole of the external gear;
a crank member that is arranged between the through hole of the external gear and the support pin of the carrier, and comprises an input gear and an eccentric disk that is fitted into the through hole of the external gear; and
a first bearing that is arranged between the crank member and the support pin and supports the crank member such that the crank member is capable of rotating with respect to the support pin.

2. The reduction gear transmission according to claim 1, wherein at least a part of the first bearing is positioned within a range in which the eccentric disk is arranged along an axial direction of the crank member.

3. The reduction gear transmission according to claim 1, further comprising restriction members that restrict the movement of the crank member in the axial direction of the crank member, wherein
the respective restriction members are arranged at each end of the crank member in the axial direction of the crank member, and
the first bearing is a type of cylindrical roller bearing.

4. The reduction gear transmission according to claim 1, wherein the first bearing allows relative rotation of the support pin and the crank member and restricts relative movement of the support pin and the crank member in an axial direction of the support pin and the crank member.

5. The reduction gear transmission according to claim 1, further comprising a second bearing that is arranged between the internal gear and an extending portion of the carrier that extends to an outer side of the internal gear, wherein the second bearing allows relative rotation of the carrier and the internal gear and restricts relative movement of the carrier and the internal gear in an axial direction of the carrier and the internal gear.

6. The reduction gear transmission according to claim 1, further comprising a spur gear that meshes with the input gear and rotates with respect to the axis line of the internal gear; wherein
rotation of the spur gear causes the input gear to rotate while orbitally revolving with respect to the axis line of the internal gear, and
the carrier is caused to rotate, by the support pin inserted in the input gear, following the orbital revolution of the input gear.

7. A reduction gear transmission comprising:
an internal gear;
an external gear that has a through hole at a position offset from a center of the external gear and revolves orbitally with respect to the internal gear while meshing with the internal gear;
a carrier that is rotatably supported by the internal gear;
a crank member that comprises an eccentric disk rotatably fitted into the hole of the external gear via a first cylindrical roller bearing and is rotatably supported by the carrier via a second cylindrical roller bearing; and
a movement restricting member that is arranged between the crank member and the carrier, contacts the crank member, and restricts the movement of the crank member in an axial direction of the crank member.

8. The reduction gear transmission according to claim 7, wherein
the external gear has another through hole at a position offset from the center of the external gear, and
a part of the carrier passes through the other through hole.

9. The reduction gear transmission according to claim 7, further comprising another bearing that is arranged between the internal gear and an extending portion of the carrier that extends to an outer side of the internal gear, wherein the other bearing allows relative rotation of the carrier and the internal gear and restricts relative movement of the carrier and the internal gear in an axial direction of the carrier and the internal gear.

* * * * *